United States Patent [19]

Franch

[11] 4,198,881
[45] Apr. 22, 1980

[54] ROTATIONAL SPEED AND TORQUE MECHANICAL TRANSDUCER

[76] Inventor: Gino Franch, 10, Via G.Avezzana, Milan, Italy

[21] Appl. No.: 887,732

[22] Filed: Mar. 17, 1978

[30] Foreign Application Priority Data

Jul. 1, 1977 [IT] Italy .................................. 4845 A/77

[51] Int. Cl.² ............................................. F16H 37/06
[52] U.S. Cl. ............................ 74/665 R; 74/665 GC; 74/674; 74/751
[58] Field of Search .......... 74/665 R, 665 F, 665 GC, 74/674, 751

[56] References Cited

U.S. PATENT DOCUMENTS

| | | | |
|---|---|---|---|
| 3,394,619 | 7/1968 | Preston | 74/751 |
| 3,439,561 | 4/1969 | Preston | 74/751 |
| 3,540,308 | 11/1970 | Preston | 74/751 |

*Primary Examiner*—C. J. Husar
*Assistant Examiner*—Frank McKenzie
*Attorney, Agent, or Firm*—Spellman, Joel & Pelton

[57] ABSTRACT

The rotational speed and torque mechanical transducer comprises an outer rotor connected to the motor through a power input shaft; a transverse shaft rotatably mounted at the interior of the outer rotor, and presenting an inner rotor secured thereon; a second shaft rotatably mounted in the inner rotor at right angles with respect to the axis of said inner rotor, and carrying secured thereon a central rotor; an intermediate rotor rotatably mounted around the axis of the inner rotor, and connected through a gear transmission with the shaft of the central rotor, and through another gear transmission with a main output shaft, while the shaft of the inner rotor is connected through a gear transmission with an auxiliary output shaft.

10 Claims, 2 Drawing Figures

ROTATIONAL SPEED AND TORQUE MECHANICAL TRANSDUCER

SUMMARY OF THE INVENTION

The present invention relates to a rotational speed and torque mechanical transducer between a motor and a utilizer which presents a variable torque and a variable rotational speed.

Object of the invention is to realize a mechanical transducer of this type, which presents the following advantages over the known realizations of the prior art:

(1) An automatic adaptation of the power transmission to the variations of rotational speed and of torque, i.e. to the required output of the utilizer.

(2) A greater stability of the transmission of power, more particularly a linear variation of the torque transmitted to the utilizer in relationship with the variation or the rotational speed.

(3) A supplementary possibility of controlling the transmitted torque through small variations of the motor speed. The transmitted torque is in fact directly proportional to the square of the motor speed.

(4) A higher efficiency of the transmission of power, in consideration of the fact that the power losses are practically limited to the losses depending on the gear transmissions and on the bearings. It is in fact excluded the use of devices which can dissipate energy, such as friction clutches or the like.

The above and other advantages are obtained by employing the mechanical transducer according to the present invention, in which the transmission of power is obtained thanks to the forces of Coriolis which act on a so-called "active" mass of a central rotor, as well as thanks to the interaction of the mechanical forces between the motor and the utilizer. The forces of Coriolis exerted on the "active" mass present a mean value which necessarily is equal to zero. During the operation, the said forces of Coriolis present a sinusoidal form. The relative speed of the active mass therefore varies between a maximum and a minimum value.

According to a possible embodiment, the minimum value of the relative speed of the active mass has been chosen equal to zero. As a consequence, the relative speed of the active mass is unidirectional. For this purpose, there may be provided a ratchet mechanism, which permits the rotation of the active mass, respectively of the central rotor, in a single direction, and/or the main output shaft can be connected to the utilizer through a freewheel device.

The rotational speed and torque mechanical transducer according to the invention can be provided with particular devices for reducing the load on the bearings. In such a manner, it is possible to substantially increase the machine speed and its specific power.

The particular features of the transducer according to the invention will appear evident from the following description of a preferred embodiment, made with reference to the attached drawings.

DESCRIPTION OF THE PREFERRED EMBODIMENT

Figure 1:
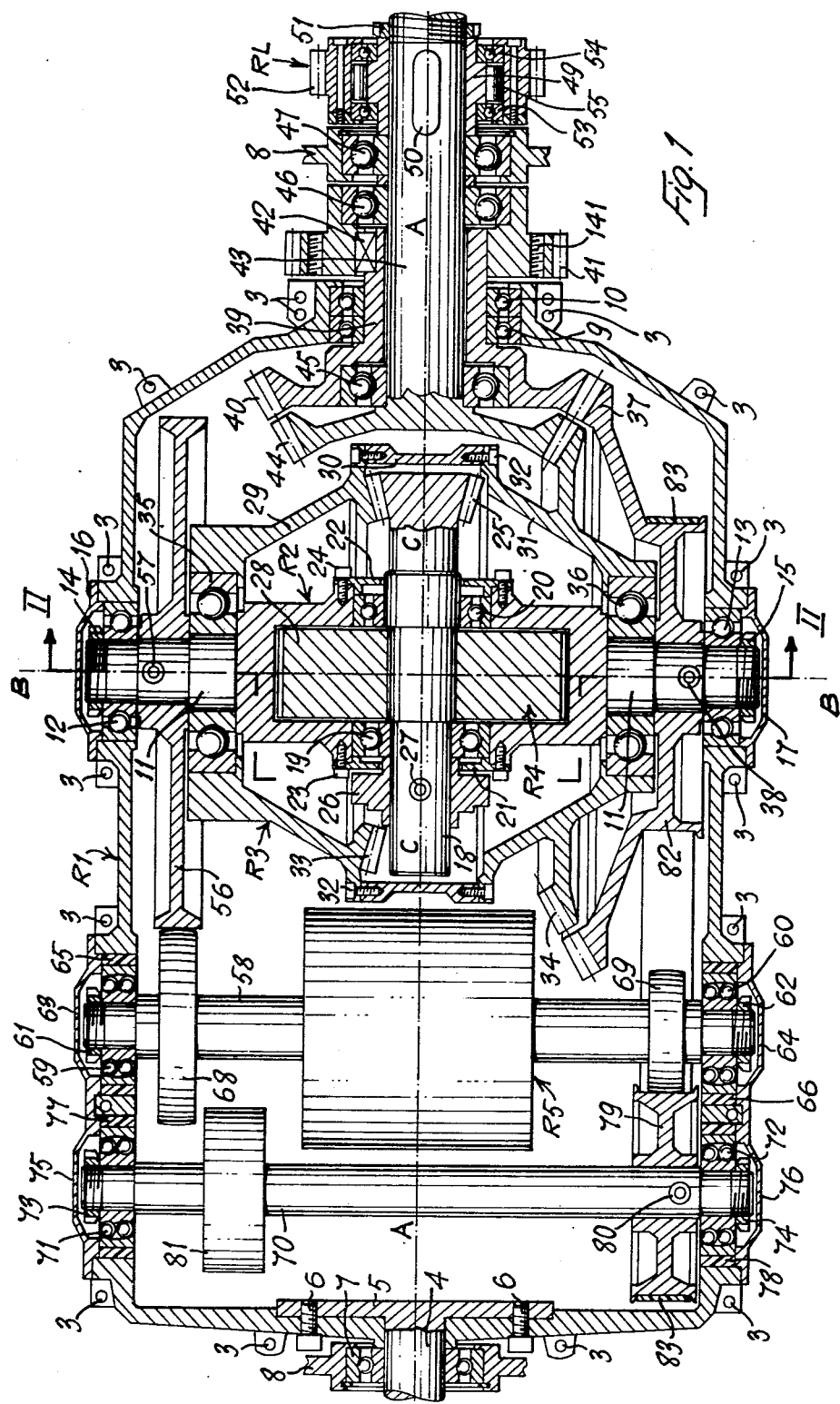
FIG. 1 is a longitudinal section of a rotational speed and torque mechanical transducer according to the invention.

The rotational speed and torque transducer according to the invention, as illustrated in the drawings, consists of an outer rotor R1 which is constructed as a hollow casing made of two pieces which are closed together for example by means of bolts, at 3.

With reference to FIG. 1, to the left head end of the outer rotor R1 there is secured the power input shaft 4, by means of an inner flange 5 and of bolts 6, said input shaft 4 being coaxial to the said outer rotor R1. The outer rotor R1 is rotatably supported by the machine frame 8 by means of the said input shaft 4 and of a suitable bearing 7. The power input shaft is connected to the power source, not represented.

An auxiliary output shaft 39 enters into the right head end (always referring to FIG. 1) of the rotor R1. Said auxiliary output shaft 39 is constructed as a hollow shaft, and it is coaxial to the input shaft 4. The outer rotor R1 is rotatably mounted onto said auxiliary output shaft 39 by means of bearings 9, 10. A main output shaft 43 passing through the said hollow auxiliary output shaft 39 is rotatably mounted by means of a bearing 45 on a corresponding end portion of the auxiliary output shaft 39 at the interior of rotor R1, and by means of a bearing 47 on the machine frame 8, at the exterior of the outer rotor R1.

At the interior of the outer rotor R1 there is arranged an inner rotor R2, which is rotatably mounted around an axis B—B perpendicular to the longitudinal or rotational axis A—A of the outer rotor R1. The inner rotor R2 consists of the median enlargement or thickening of the shaft 11, which shaft 11 is rotatably mounted at the interior of the outer rotor R1 by means of bearings 12, 13 and of fastening covers 16, 17. The ring nuts 14 and 15 are arranged so as to permit small adjustments in axial direction of the shaft 11 and consequently of rotor R2. In correspondence of the upper end of shaft 11 there is secured, by means of a locking pin 57, a friction roller or disc 56. In correspondence of the lower (opposed) end of the shaft 11 there is secured, by means of a locking pin 38, a bevel gear 37, which meshes with a corresponding bevel gear 40 provided on the inner end of the auxiliary output shaft 39.

On the transverse shaft 11 there is mounted, rotatable around the inner rotor R2 by means of bearings 35, 36, an intermediate rotor R3. The said intermediate rotor R3 consists of a median cylindrical portion 30, and of two dome-shaped end portions 29, 31, which are secured to the median portion 30 by means of screws 32. In correspondence of the upper end portion 29 of the intermediate rotor R3, at the interior of same, there is provided a bevel gear 33. The opposed end portion 31 (the lower one, in FIG. 1) of the intermediate rotor R3 is provided with an outer bevel gear 34, which meshes with a corresponding bevel gear 44 obtained on the inner end of the main output shaft 43.

On the inner rotor R2 there is rotatably mounted, by means of bearings 19, 20, fastening covers 21, 22 and screws 23, 24, a shaft 18, the axis C—C of which shaft 18 lies in the plane of the longitudinal or rotational axis A—A of the outer rotor R1. A central or core rotor R4 is secured on this shaft 18. The said central rotor R4 consists of a cylindrical, so-called "active" mass 28, and is rotatably mounted in a corresponding recess obtained in the inner rotor R2. In correspondence of its right end, projecting out of the inner rotor R2, the said shaft 18 is provided with a bevel gear 25 which meshes with the inner bevel gear 33 of the intermediate rotor R3. On the opposite end (the left end in FIG. 1) of the said shaft 18, projecting out of the intermediate rotor R2, there is keyed, by means of a locking pin 27, a counterweight 26.

A ratchet gear mechanism is provided between the shaft 18 of the central rotor R4 and the inner rotor R2, which mechanism will be described later in the course of the description, and which serves for permitting the rotation of shaft 18 only in one direction, which will be conventionally regarded as the positive direction.

At the exterior of the outer rotor R1, on the auxiliary output shaft 39 there is secured, by means of a key 42, a toothed wheel 41, which serves for the possible coupling with another wheel, for transmission, control or utilization purposes. In the embodiment shown, the toothed wheel 41 presents threaded bores 141 which may serve for its fastening or blocking to the machine frame 8.

The inner ring 49 of a freewheel RL is secured, by means of a key 50, onto the main output shaft 43. The axial positioning of the said freewheel RL can be adjusted by means of the ring nut 51. The outer ring of the freewheel RL is constructed as a toothed wheel and is mounted on bearings 53, 54. The locking rollers 55 arranged between the inner ring and the outer ring of the freewheel RL permit the relative rotation of both rings of the freewheel only in one direction.

The outer rotor R1 is driven by the power source (motor) through the input shaft 4 with an angular speed $\omega_f$ around the longitudinal axis A—A. Consequently, the central or core rotor R4, i.e. the active mass 28 of the said rotor R4, is driven at the same angular speed $\omega_f$ around the longitudinal axis A—A on the inner rotor R2 arranged at the interior of outer rotor R1.

The inner rotor R2 rotates around the transverse axis B—B with an angular speed $\omega_b$, which is determined by the epicyclic gear system consisting of outer rotor R1 and of bevel gears 37, 40. The inner rotor R2 carries also the intermediate rotor R3 and the central rotor, and imparts to the active mass 28 of the central rotor R4 an angular speed $\omega_b$ around the transverse axis B—B. The angular speeds $\omega_b$, $\omega_f$ generate in the mass 28 a torque $\mu_s$. The inner rotor R2 moreover transmits a torque $\mu_b$ to the toothed wheel 41, through the gears 37, 40.

The intermediate rotor R3 rotates around the axis B—B with an angular speed $\omega_c$, which is determined by the epicyclic gear system consisting of the outer rotor R1 and of the bevel gears 34, 44. The intermediate rotor R3 transmits to the main output shaft 43 the torque $\mu_c$ caused by the torque $\mu_s$. Onto the inner rotor R2 there acts consequently the corresponding reaction torque $-\mu_c$.

The shaft 18, and more precisely the active mass 28 rotates around the axis C—C with the unidirectional angular speed $\omega_s$, which is determined by the epicyclic gear system consisting of the inner rotor R2 and of the bevel gears 25, 33.

From the foregoing, it appears that to the active mass 28 there are imparted three angular speeds $\omega_f$, $\omega_b$, $\omega_s$. Consequently, this mass is subjected to the action of the following torques created by the accelerations of Coriolis:

a torque $\mu_s$ caused by the angular speeds $\omega_f$ and $\omega_b$, which acts onto the active mass 28 parallelly to its shaft 18, i.e. to the axis C—C, and tends to increase the angular speed $\omega_s$, a torque $\mu_{st}$ caused by the angular speeds $\omega_f$ and $\omega_s$ which acts on the active mass 28 parallelly to the transverse axis B—B and which is transmitted to the shaft 11 of the inner rotor R2 through radial stresses of the bearings 19, 20.

The operation of the rotational speed and torque mechanical transducer is based on the two torques $\mu_s$ and $\mu_{st}$. The mass 28 which generates these torques is denominated "active" mass.

The auxiliary output shaft 39 has in general an angular speed $\omega_a$. When the toothed wheel 41 is secured to the machine frame 8, then $\omega_a=0$. On the auxiliary output shaft there acts a torque $\omega_a$, which is transmitted by shaft 11 through the bevel gears 37, 40. The bevel gear 44 integral with the main output shaft 43 has the angular speed $\omega_r$. The outer ring of the freewheel RL, constructed as a toothed wheel 52 has an angular speed $\omega_g$. The freewheel RL is constructed, more precisely oriented in such a manner that $\omega_g \geq \omega_r$. In the condition of synchronism of both rings of the freewheel RL, then $\omega_r = \omega_g$. Only in this condition, the torque $\mu_r$ of the main output shaft 43 is transmitted to the toothed wheel 52.

The three angular speeds $\omega_f$, $\omega_a$, $\omega_g$ have in general a value different from zero. For the sake of simplicity, the operation of the rotational speed and torque mechanical transducer according to the invention will be described assuming that the toothed wheel 41 of the auxiliary output shaft 39 is locked to the supporting frame 8 ($\omega_a=0$). Moreover it is assumed that the pair of gears 34–44 and 37–44 present the same transmission ratio. In this case, the angular speeds $\omega_r$ and $\omega_b$ are proportional to the angular speeds $\omega_s$ respectively $\omega_f$.

The angular position of the inner rotor R2 is defined by the angle $\psi$, that the geometrical axis C—C of the shaft 18 makes with the longitudinal axis A—A. The torques $\mu_s$ and $\mu_{st}$ change in a sinusoidal manner with the angle $\psi$.

The torque imparted to the transverse shaft 11 is $\mu_b = -\mu_c + \mu_{st}$, and it is taken up by the machine frame 8 through the gear wheels 37, 40 and the auxiliary output shaft 39.

In the range (0;180) of angle $\psi$, which is indicated by $\psi_{(0;180)}$ the torque $\mu_s$ has the tendency to accelerate the intermediate rotor R3 and the central rotor R4, as well as the main output shaft 43 in the direction as allowed by the ratchet mechanism which is arranged on mass 28. The said ratchet mechanism and the freewheel RL limit the angular speed $\omega_r$ in the range (0; $\omega_g$). The angular speed of the main output shaft 43, obtained through the torque $\mu_s$ can attain at the maximum, for $\psi=180°$, a determined value which is indicated with $\omega_{ro}$.

Therefore, with $\omega_g \geq \omega_{ro}$, the angular speed $\omega_r$ in the range (0;360) of the angle $\psi$ changes between a minimum, zero value, to a maximum $\omega_{ro}$. In this case there is no possible transmission of power to wheel 52, since both rings of the freewheel RL are not synchronous.

When $\omega_g < \omega_{ro}$, there is an angle $\psi = \alpha$, for which a synchronism of both rings of the freewheel RL is established. In this case, throughout the amplitude $\psi_{(\alpha; 180)}$ the main output shaft 43 transmits the torque $\mu_r$ and the corresponding mechanical power to toothed wheel 52. With $\psi=180°$, the torque $\mu_s$ changes its sign, and the transmission of power to wheel 52 is interrupted, while the angular speed $\omega_r$ decreases, until it reaches the zero value for $\psi = 180 + \alpha$.

Therefore, when in the condition $\omega_g =$ constant $< \omega_{ro}$ the rotational speed and torque transducer according to the invention presents the following cyclical modes of operation:

- transitional phase $\psi_{(0;\alpha)}$. The angular speed of the main output shaft 43 increases from the zero value until it reaches, for $\psi=\alpha$, a value at which the condition of synchronism of both rings of the freewheel RL is obtained.
- active phase $\psi_{(\alpha;180)}$, characterized by the condition of synchronism of both rings of the freewheel RL and by the transmission of mechanical power and torque to the toothed wheel 52.
- transitional phase $\psi_{(180;\ 180+\alpha)}$. The angular speed $\omega_r$ decreases from value $\omega_g$ down to zero value.
- waiting phase $\psi_{(180+\alpha;\ 360)}$, in which $\omega_r=0$ and the ratchet mechanism applied to the active mass 28 does note permit to the said mass to assume a speed $\omega_s$ in opposite direction.

For $\omega_g=0$ the active phase presents the maximum amplitude of 180° and therefore also the mean value $M_g$ of the torque transmitted to the gear wheel 52 reaches its maximum value. Upon increase of the speed $\omega_g$ in the interval $(0;\ \omega_{ro})$ the amplitude of the active phase decreases and it reaches its zero value for $\omega_g=\omega_{ro}$. Owing to this fact, with the increase of speed $\omega_g$, the useful torque $M_g$ decreases automatically and in a continuous manner from a maximum value to zero.

The same transmission of power is in the current practice obtained only in a stepwise manner and through the action of the driver, by employing a gear shift mechanisms with clutch (or a torque converter).

It is still to be noted that the torques of the auxiliary output shaft 39 and of the main output shaft 43 increase with the square of the speed $\omega_f$ of the power input shaft 4, whereby it is possible to obtain a further control of the transmitted power through small changes of the motor speed.

Upon variation of the angular speeds $\omega_f$, $\omega_a$, $\omega_r$ also the value and the sign of the torques transmitted by the shafts 4, 39 and 43 is varied. The operation of the transducer is however in any case characterized by the following features:

- the sum of the mean values of the powers which are transmitted from the shafts 4, 39 and 43 is equal to zero.
- the sum of the mean values of the torques which are transmitted from the shafts 4, 39 and 43 is equal to zero.

These features define the balance of energy and the dynamic equilibrium of the system. At the same time, they demonstrate the possibility of establishing between the input shaft and the output shaft of a rotational speed and torque mechanical transducer, a new type of connection based on the forces of Coriolis, and which is adapted for effecting a mutual exchange, between the said shafts, of mechanical power. It is even possible a transmission of power from the utilizer to the motor.

Hereafter it will be described, in order to complete the description of the transducer, an embodiment of the ratchet mechanism which establishes the direction of rotation of the active means 28, i.e. the direction of the angular speed $\omega_s$ of the central rotor R4. Moreover, it will also be described a device which has been provided in order to avoid additional stresses on the outer rotor R1 and on the inner rotor R2.

Figure 2:
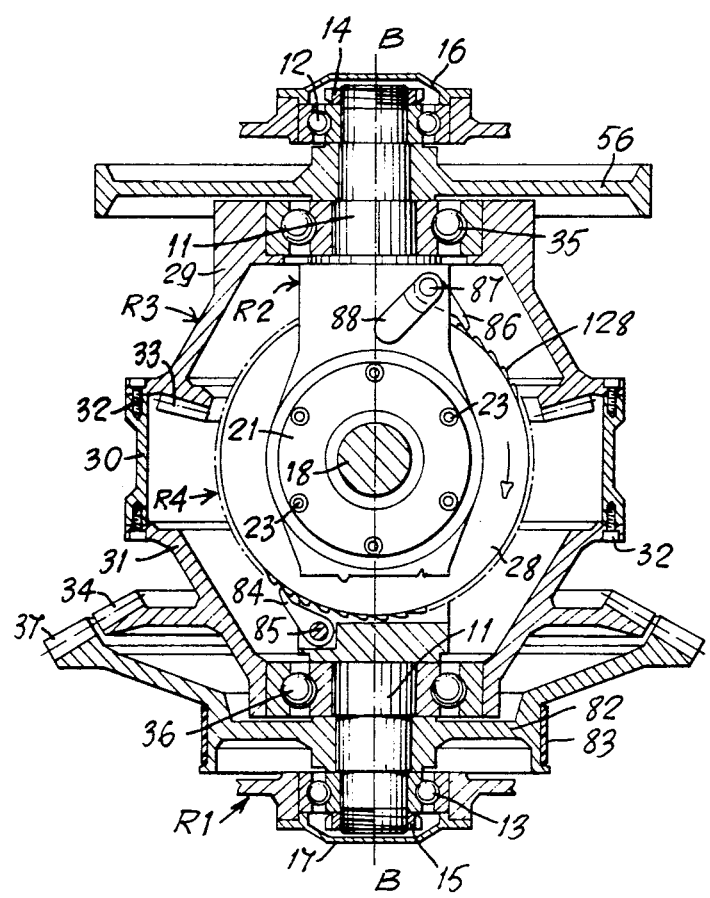
FIG. 2 is a transverse section along line II—II of FIG. 1.

In FIG. 2 there is illustrated a ratchet mechanism for establishing the direction of the angular speed $\omega_s$ of the shaft 18, resp. of the active mass 28. The said mechanism comprises a pheripheral toothing 128 on the active mass 28, which cooperates with two diametrally opposed pawls 84, 86 arranged on the transverse shaft 11. The said pawls 84, 86 are arranged in such a manner that they permit the rotational movement of the active mass 28 in just one direction, for example in the clockwise direction in the embodiment shown in FIG. 2. The force which keeps the pawls 84, 86 in engagement with the toothing 128 of the active mass 28 is dynamically controlled. For this purpose, each pawl 84, 86 is secured to a pin 85, resp. 87, rotatably mounted in the transverse shaft 11. To each pin 85, 87 there is secured an excentric mass 88, onto which there act the following forces;

a centrifugal force produced by speed $\omega_f$, which constantly pushes the pawls 84, 86 against the toothing 128 of the active mass 28.

a force of Coriolis produced by the angular speeds $\omega_f$ and $\omega_b$, which has an action which is concordant with or opposed to the said centrifugal force, depending whether the active mass 28 is urged by the torque $\mu_s$ to rotate in the direction allowed by the pawls, or in the direction not permitted by the said pawls. In this manner the friction is reduced and the operating safety of the pawls is increased.

It is evident that the system employed in order to render unidirectional the rotation of the contral rotor R4, respectively of the active mass 28 can be of any other suitable type. Moreover, this ratchet mechanism can be arranged directly on the main output shaft 43.

To the rotors R2 and R3 there are imparted respectively the two angular speeds $\omega_f$, $\omega_b$ and $\omega_f$, $\omega_c$, which produce a total torque $\mu_o$ of the Coriolis forces. This torque $\mu_o$ tends to rotate the transverse shaft 11 of an angle of 90° around an axis which is perpendicular to the plane of the axes A—A and B—B, in such a manner that the angular speed $\omega_b$ of the transverse shaft 11 is parallel to and concordant with the angular speed of the outer rotor R1. If no contrary measures are taken, the torque $\mu_o$ is transmitted to rotor R1, thus giving origin to vibrations and overloads on bearings 7, 9, 10, 12, 13, 45, 46 and 47.

In order to eliminate these inconveniences, there is provided the compensation rotor R5, which is secured to a shaft 58 parallel to the shaft 11 and transversal with respect to the longitudinal axis A—A. The shaft 58 is rotatably mounted at the interior of the outer rotor R1 by means of bearings 59, 60 in combination with adjustment locking ring nuts 61, 62 and fastening covers 63, 64, and rotates with an angular speed $\omega'_b$ which is directed contrary to the angular speed $\omega_b$. The compensation rotor R5 consists of a cylindrically shaped mass which has been calculated in such a manner that as a consequence of the angular speeds $\omega_f$ and $\omega'_b$ and of the resulting forces of Coriolis, it generates a torque $\mu'_o$ which is equal and contrary to the torque $\mu_o$.

The torques $\mu_o$ and $\mu'_o$ are compensated without additional stresses of the bearings 12, 13, 59 and 60. For this purpose, the compensating rotor R5 is driven by means of two friction wheels 68 and 69 which are secured, at opposed sides of the cylindrical mass, on the shaft 58. The friction wheel 68 is in direct engagement with the friction disc 56 secured on the transverse shaft 11. The other friction wheel 69 is in frictional engagement with a pulley 79 constructed as friction wheel, which pulley is secured by means of a locking pin 80 on a counter-shaft 70. The counter-shaft 70 is rotatably mounted on the side of the shaft 58 opposite to the transverse shaft 11, at the interior of outer rotor R1 by means of bearings 71, 72 in combination with adjustable ring nuts 73, 74 and fastening covers 75, 76. The pulley 79 is driven through a belt 83 by a pulley 82 secured on the transverse shaft 11. The friction wheels 68, 69 of the shaft 58 lie against the corresponding driving wheels 56, 79 on diametrally opposed sides. In this manner it is obtained the equilibrium between the inner rotor R2 and the compensating rotor R5 in relation to the rotation, about an axis which is perpendicular to the plane of the axes A—A and B—B, without additional stresses on the bearings, through mutual compression stresses between the pairs of friction wheels 56, 68 and 69, 79 and through a tensile stress on both runs of the belt 83. The diameters of the friction wheels 68, 69, of the friction disc 56 and of the pulley 82 are of course selected in such a manner as to avoid any relative slippage.

The bearings 59, 60, 71 and 72 are of the swinging or self-aligning type and their outer rings are embedded in packing rings 65, 66, 77, 78 made of synthetic rubber. This permits to have a condition of tensile stress in the belt and of compressive stress in the friction wheels. On the counter-shaft 70 there is secured a cylindrical mass 81 which acts as counterweight to the pulley 79.

Of course the invention is not limited to the above described embodiment, but many variations and modifications, particularly from the constructive viewpoint, are possible, without departing from the inventive idea.

I claim:

1. A rotational speed and torque mechanical transducer between a motor and a utilizer which presents a variable torque and a variable rotational speed, comprising in combination:
   (a) an outer rotor connected to the motor through a power input shaft;
   (b) a transverse shaft rotatably mounted at the interior of the outer rotor, transversally with respect to the longitudinal or rotation axis of the outer rotor, said transverse shaft presenting an inner rotor secured thereon;
   (c) a second shaft rotatably mounted in the inner rotor, arranged at right angles with respect to the axis of rotation of the inner rotor, and lying in the plane of the longitudinal axis of the outer rotor, said second shaft carrying secured thereon a central or core rotor which is formed as an active mass, rotatably arranged in a recessed portion of the inner rotor;
   (d) an intermediate rotor rotatably mounted around the axis of rotation of the inner rotor, said intermediate rotor being operatively connected through a gear transmission with the shaft of the central rotor and through another gear transmission with a main output shaft, while the shaft of the inner rotor is connected through still another gear transmission with an auxiliary output shaft which is coaxial to the said main output shaft;

the design and arrangement of the above mentioned components being such that a torque parallel to the axis of rotation of the central rotor, and a torque parallel to the axis of rotation of the inner rotor act together onto the active mass of the central rotor, as a consequence of the angular speeds of the outer rotor, of the inner rotor and of the central rotor and of the resulting forces of Coriolis, and the sum of the means values of the powers and torques transmitted by the power input shaft, by the main output shaft and by the auxiliary output shaft is equal to zero.

2. A transducer according to claim 1, in which there is further provided a ratchet mechanism for permitting the rotation of the active mass of the central rotor in a single direction.

3. A transducer according to claim 1, in which the main output shaft is connected to the utilizer through a freewheel mechanism.

4. A transducer according to claim 1, in which the auxiliary output shaft can be connected to the machine frame by means of a torque reaction support.

5. A transducer according to claim 2, in which the ratchet mechanism consists of a peripheral toothing provided on the active mass of the central rotor, which cooperates with at least one pawl swingably mounted on the inner rotor.

6. A transducer according to claim 5, in which the ratchet mechanism presents two pawls which are arranged diametrically opposed in a swingable manner on the inner rotor.

7. A transducer according to claim 5, in which each pawl is secured on a pin swingably mounted on the inner rotor, said pin presenting an eccentric mass.

8. A transducer according to claim 1, in which a compensating rotor, drivingly connected with the shaft of the inner rotor, is secured on a shaft rotatably mounted at the interior of the outer rotor, parallel to the said shaft of the inner rotor.

9. A transducer according to claim 8, in which on the shaft of the compensating rotor, at both sides of the said rotor, there is secured a friction wheel, one of said friction wheels being directly operatively connected with a friction disc secured on the shaft of the inner rotor, while the other friction wheel operatively cooperates with a pulley presenting a friction surface, which pulley is secured onto a counter-shaft rotatably mounted at the interior of the outer rotor, parallel to the shaft of the compensating rotor and arranged diametrally opposed with respect to the inner rotor, and which pulley is drivingly connected through a belt to another pulley secured to the shaft of the inner rotor.

10. A transducer according to claim 9, in which the shaft of the compensating rotor and the counter-shaft coordinated thereto are mounted on bearings which are constructed as swinging or self-aligning bearings, embedded in synthetic rubber material.

* * * * *